Aug. 17, 1948.  M. H. LERCHE  2,447,189
FUEL GAUGE

Filed April 16, 1945  2 Sheets-Sheet 1

Inventor
M. H. Lerche
By Randolph & Beavers
Attorneys

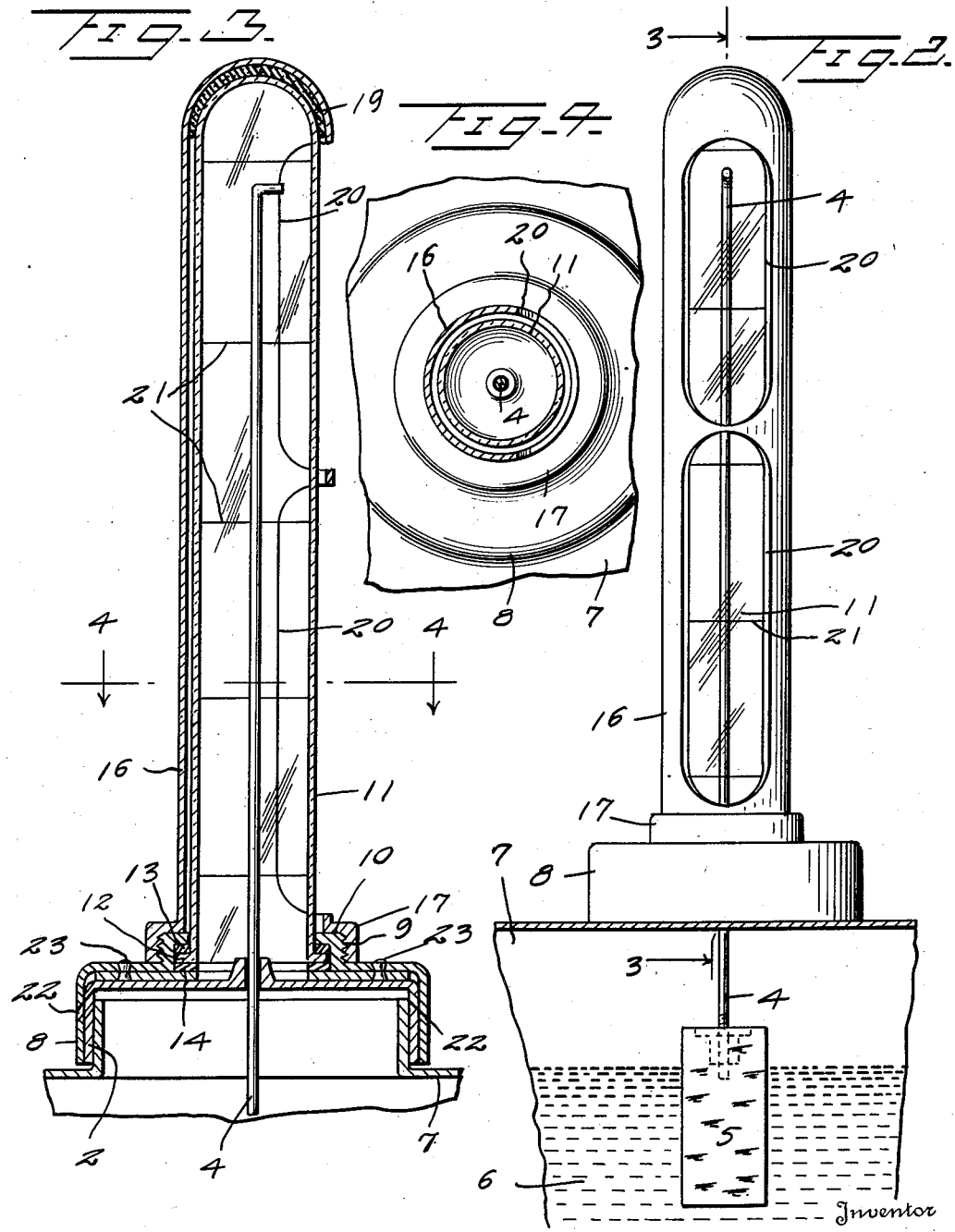

Patented Aug. 17, 1948

2,447,189

UNITED STATES PATENT OFFICE 2,447,189

FUEL GAUGE

Myron H. Lerche, Mobile, Ala.

Application April 16, 1945, Serial No. 588,594

1 Claim. (Cl. 73—305)

This present invention relates to improvements in covers for airplane gas gauges.

The main object of this invention is the construction of a transparent weather-proof cover for aeroplane gas gauges which may be manufactured at low cost and is of simple structure.

In the drawings:

Fig. 1 is a side elevation of a preferred embodiment of my invention mounted on an airplane;

Fig. 2 is an enlarged front view of the same;

Fig. 3 is a still more enlarged longitudinal diametrical vertical section on line 3—3 of Fig. 2;

Fig. 4 is a transverse, horizontal section on line 4—4 of Fig. 3;

Fig. 5 is a diametral vertical section through a cover slightly modified and prior to its assembly;

Fig. 6 is a section through the modified assembled cover.

In the drawings in which like reference characters designate like or similar parts, Fig. 3 shows a conventional gas cap 2 having in its top a central boss with an aperture 3 through which passes a gas gauge rod 4 with ample clearance. The lower end of the rod (Fig. 2) is supported by a cork float 5 floating in the gas 6 the depth of which is to be measured by the rod. Rain or water vapor enters the gas tank 7 through the clearance referred to.

Fig. 1 shows the cover structure to be described mounted on an aeroplane in front of the wind shield, the outer guard having been omitted. 8 is a cover of metal or plastic that fits snugly over the gas cap, and is provided on the top with an opening and a neck portion 9 rising therefrom and having at the upper end an inwardly extending flange 10. The glass tube 11 is closed at the upper end and is of a diameter somewhat less than the diametral distance between points on the inner edge of the flange. At the lower end the tube has a flange 12 of a radial width to lie beneath the flange on the cover. The rubber washers 13, 14, are cemented to the top and bottom respectively of the glass tube flange. Rubber washers may also be cemented to the top surface of the large metal or plastic washer 15 (Figs. 5, 6).

A protective guard 16 preferably of metal has an enlarged interiorly threaded base position 17 by which it is screwed upon threads 18 on the neck portion of the cover.

Between the inner hemispherical top surface of the guard and the exterior top surface of the glass tube is sponge rubber 19.

The guard has two cut outs or windows 20 on its front side through which the rod may be observed. The glass tube is provided with spaced horizontal lines 21 indicating by their alignment with a reference line on the rod the gas level in the tank and therefore explained by such legends as "Full, ¾, ½, ¼, Empty."

This glass weather proof cover can be used with or without the protective metal cover.

If the gas cap is not designed with proper vent holes, such holes 22 may be drilled at an upward slant of about 45° after the assembly is complete.

This gas gauge cover can either be placed on the gas gauge temporarily or it may be fastened to the gas cap by rivets 23, the intermediate portions of which pass through the plate or washer 15 (Figs. 5, 6).

Various changes in the form, proportion and minor details of construction may be resorted to without departing from the principles or scope of this invention as defined in the appended claim.

What I claim and desire to secure by Letter Patent is:

In a fuel gauge, a pair of inverted telescoping cup members, one located upon the other, the upper cup member provided with an upstanding hollow and externally threaded neck, said neck being open at its top, an inwardly directed annular flange at the open top of the neck, a gauge tube disposed through the open top of the neck and having a flanged lower end seated in the hollow neck below the annular flange, said lower cup being secured to the upper cup to provide a portion preventing downward displacement of the lower end of the tube and a protective housing for the tube having a gauge tube viewing opening and internal threads at its lower end to engage the threads of the neck.

MYRON H. LERCHE.

REFERENCES CITED

The following references are of record in the file of this patent:

UNITED STATES PATENTS

| Number | Name | Date |
|---|---|---|
| 1,601,532 | Kaufman | Sept. 28, 1926 |
| 1,989,366 | Jones | Jan. 29, 1935 |
| 2,021,615 | Stuart | Nov. 19, 1935 |
| 2,255,310 | D'Arcey | Sept. 9, 1941 |
| 2,316,377 | Wilhelm | Apr. 13, 1943 |

FOREIGN PATENTS

| Number | Country | Date |
|---|---|---|
| 651,949 | France | Oct. 16, 1928 |